Aug. 27, 1935.　　　C. S. HAZARD　　　2,012,563
CUT-OFF FOR METERS
Filed June 8, 1934　　　3 Sheets-Sheet 1

INVENTOR
Charles S. Hazard
BY
Hoguet & Neary
ATTORNEYS

Aug. 27, 1935.  C. S. HAZARD  2,012,563
CUT-OFF FOR METERS
Filed June 8, 1934   3 Sheets-Sheet 2

INVENTOR
Charles S. Hazard
BY
Hoguet & Neary
ATTORNEYS

Patented Aug. 27, 1935

2,012,563

UNITED STATES PATENT OFFICE 2,012,563

CUT-OFF FOR METERS

Charles S. Hazard, New York, N. Y., assignor to Neptune Meter Company, a corporation of New Jersey Application June 8, 1934, Serial No. 729,582

11 Claims. (Cl. 221—101)

This invention relates to stop or cut-off devices and more particularly to improvements in cut-off devices operated by a fluid meter for causing automatic closing of a valve associated with the meter when a predetermined quantity of fluid has passed through the meter.

Cut-off devices of this type operate to unlock an automatically closing valve when the indicator of the cut-off device has been operated to an extent corresponding to the predetermined quantity of fluid it is desired to deliver from the pump or tank truck with which the metering device is associated. However, the valve does not ordinarily become fully closed immediately on unlocking by the cut-off device. The delay in full closing of the valve usually results either from friction between the valve stem and its bushing, which must be associated in very close fitting relation to avoid leakage, or because of the provision of a dash-pot to avoid hydraulic shocks that might result from the rapid closing of the valve. Such delays in the full closing of the valve after a predetermined flow through the meter has caused operation of the cut-off mechanism to unlock the valve, may result in the delivery of excess quantities of fluid. Several gallons of fluid may thus pass through the meter during closing of the valve, before the latter is effective to stop the flow. Furthermore, variations in the viscosity of the fluid being measured will also affect the closing action of the valve with consequent inaccuracy in the meter reading although the adjustment may have been such when the device was placed in service as to insure proper closing of the valve and an accurate delivered quantity for fluid of a given viscosity. An object of the present invention is to provide cut-off devices of the type under consideration with means for compensating for the quantity of fluid that passes through the meter during gradual closing of the valve, and, as well, for changes in the viscosity and rate of flow of the fluid being measured under a given set of conditions.

Under certain conditions it is necessary to manually close the control valve before completion of delivery of the quantity of fluid for which the cut-off indicator is set. This may be due to the fact that an emergency, such as a fire hazard, has arisen or because it is discovered that the cut-off indicator dials have been inadvertently set to a greater or lesser quantity than it is desired to deliver and require readjustment in order to cause delivery of the proper quantity. In prior devices the manual release of the valve, or more specifically of its control lever, has been effected by manually operating a plunger, or the like, on the meter casing to disengage the cut-off mechanism from locking relation with the valve lever. However, an attendant reacting to emergency conditions would instinctively grasp the valve lever to close the valve and finding the lever locked by the cut-off mechanism would have to locate the releasing plunger on the meter, thus causing delay in closing of the valve when emergency conditions require prompt discontinuance of the flow of fluid. Another object of the present invention is to enable direct operation of the valve lever to close the valve under emergency conditions.

Other objects and advantages of the invention will become apparent upon consideration of the following detailed description and appended claims when read in conjunction with the accompanying drawings in which:

Figure 1:
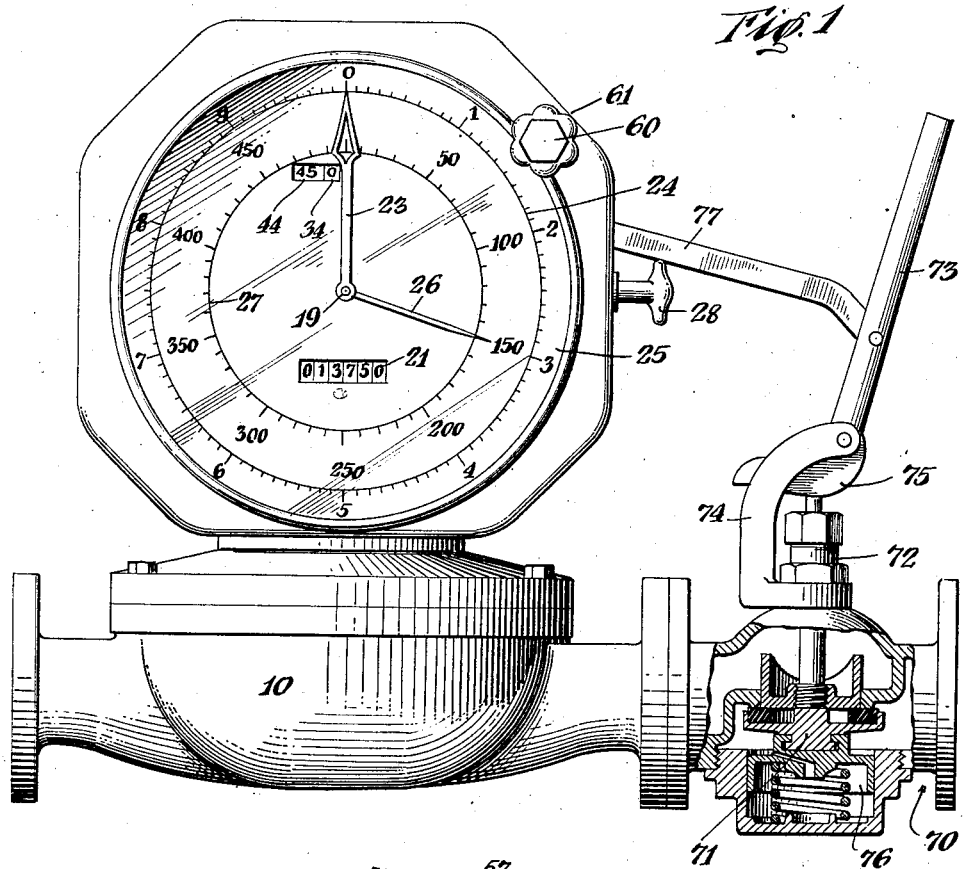
Figure 1 is a front elevation, partly in section, of a metering device embodying the cut-off mechanism of the invention.
Figure 3:
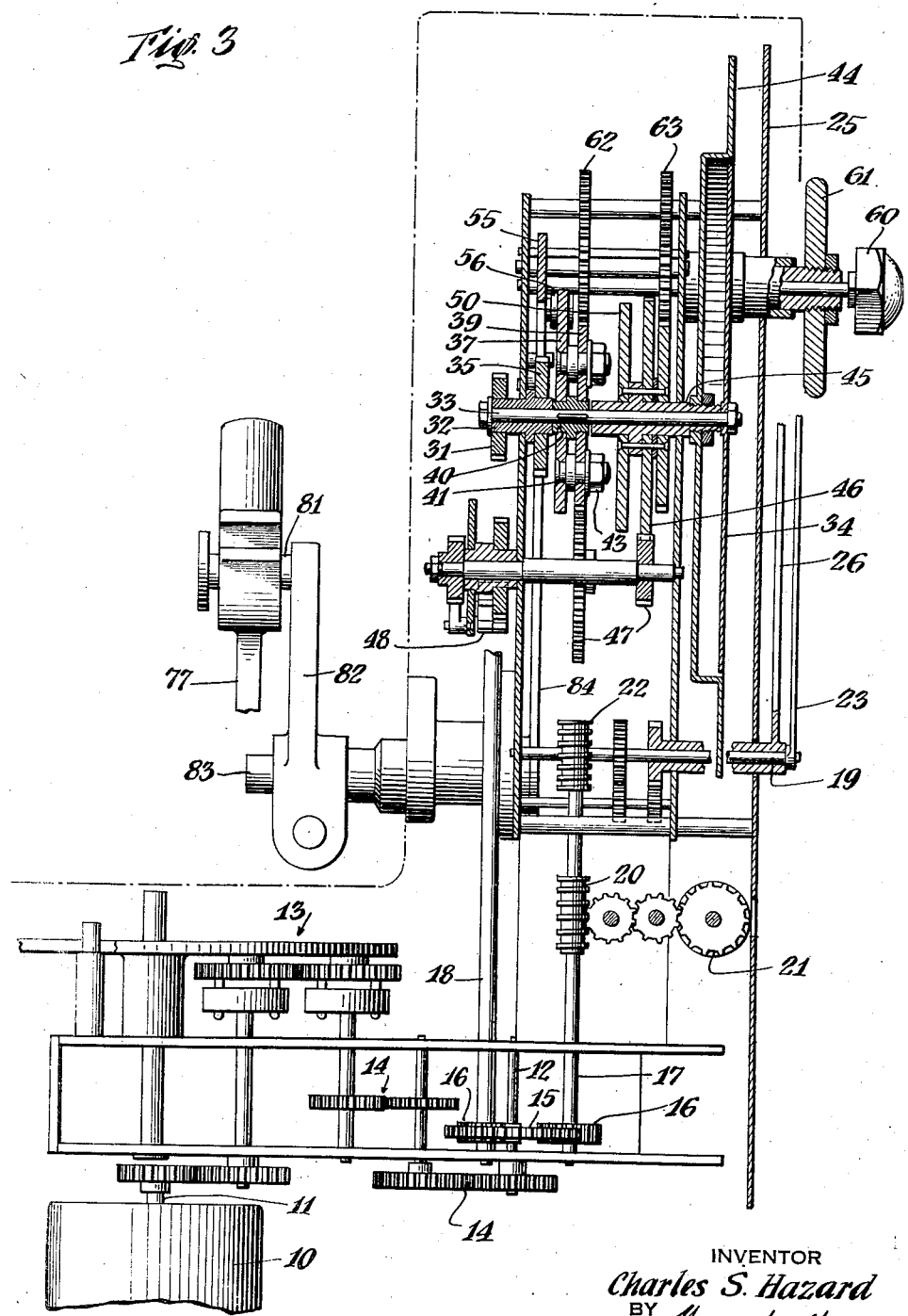
Figure 3 is a sectional elevation along the line 3—3 in Figure 2 illustrating the registering and cut-off devices that are operated by the meter.

Referring to Figures 1 and 3, the numeral 10 designates a meter having a shaft 11 operated in response to the flow of fluid for actuating the registering mechanisms and the cut-off device of the invention. The meter shaft 11 drives a stub shaft 12 through the intermediary of adjustable compensating mechanism 13 and speed reduction gearing 14. The compensating mechanism indicated generally at 13 is adapted to calibrate the registering device to coordinate it with the particular measuring unit with which it is associated in order to accurately register the quantities of liquid flowing through the meter.

This mechanism is also adapted to enable adjustments to be made to insure accurate registration when measuring the flow of fluids of different viscosity or to enable correction for changes in the viscosity and/or temperature of the particular fluid being measured. The speed reduction gearing 14 is provided for reducing the relatively high operating speed of the measuring unit to a rate suitable for operating registering and cut-off mechanism.

Stub shaft 12 driven in accordance with the flow of liquid through the meter as described above is provided with a pinion 15 engaging individual pinions 16 on power take-off shafts 17, 18, to drive the latter. Power take-off shaft 17 is provided with a worm 20 for operating a registering device 21 to indicate the total quantity of fluid passing through the meter. A worm 22 on shaft 17 operates a pointer 23 over a scale 24 on a dial 25 to indicate deliveries in units of gallons and, through suitable transfer mechanism, a pointer 26 over a concentric scale 27 to indicate tens of gallons delivered. Any suitable resetting mechanism, actuated by a manually operable resetting button 28, is provided for restoring the pointers to zero at the end of each delivery.

Figure 4:
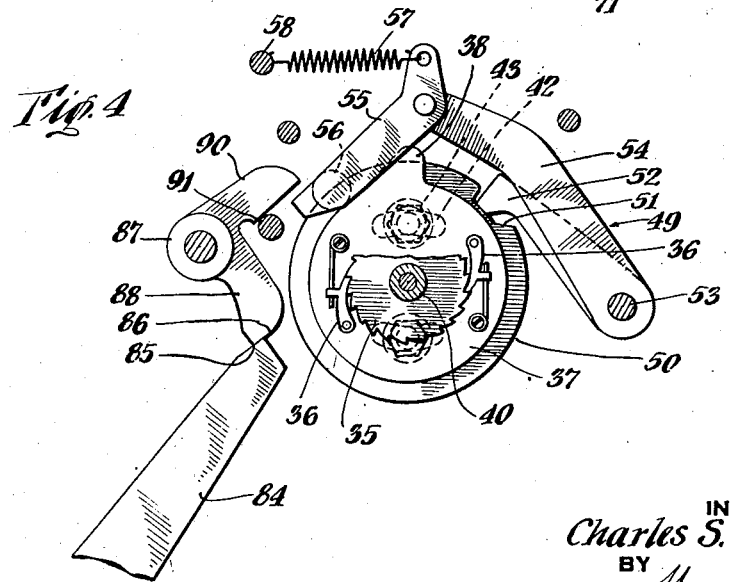
Figure 4 is a fragmentary view illustrating another position for certain of the parts shown in Figure 2.
Figure 2:
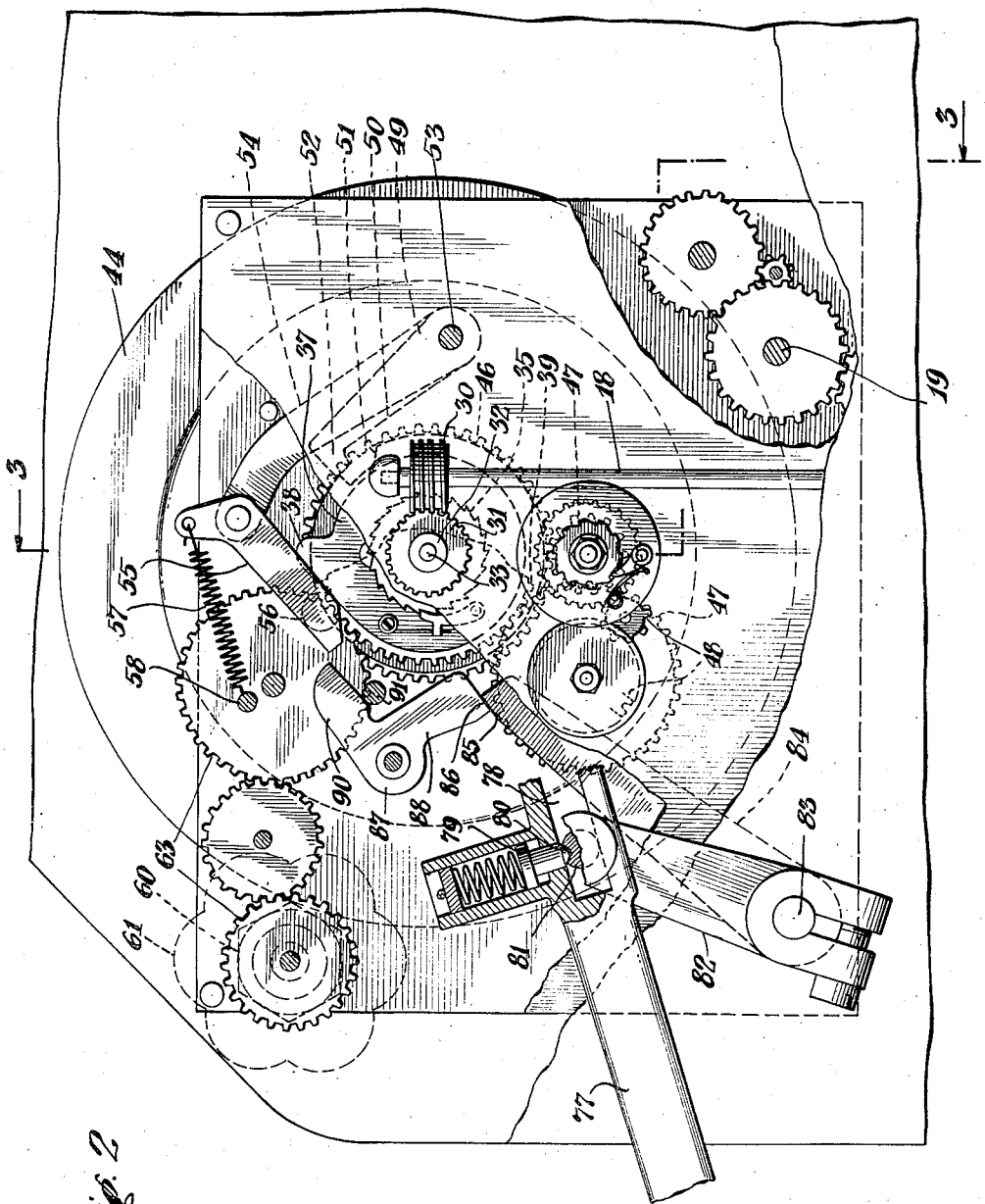
Figure 2 is a rear elevation of the cut-off mechanism, some parts being broken away and others shown in section to illustrate details of construction.

Power take-off shaft 18 is provided with a worm 30 (Fig. 2) engaging a worm wheel 31 secured to a sleeve 32 rotatably mounted on a shaft 33 carrying the units dial 34 of the cutoff indicator which may be viewed through a window in dial 25. Sleeve 32 also carries a finely toothed ratchet 35 engaging pawls 36, Figs. 2 and 4, mounted on a cam disc 37 adjustably secured to a gear 39 carried by a sleeve 40 fixed to the shaft 33 carrying the units dial 34 for driving the latter. As shown in Figs. 3 and 4, the cam disc 37 is provided with studs 41 engaging in arcuate slots 42 in the gear 39 so that the cam may be rotated on sleeve 40 and adjusted relatively to the gear thereon. The adjustment is maintained by lock nuts 43. The purpose of this arrangement will be set forth later. A combination tens and hundreds dial 44 is mounted on a sleeve 45 that is rotatable on shaft 33 and carries a gear 46 driven from gear 39 through intermediate gearing 47 including a Geneva movement 48, as shown in Fig. 2, so that the tens dial 44 is advanced one increment for each rotation of units dial 34.

A notched disc 50 mounted on sleeve 45 in fixed position relatively to gear 46 is peripherally engaged by the arm 52 of a double armed rocking lever 49 mounted on a pin 53. The other arm 54 of the rocking lever supports a pivotally mounted tripping pawl 55 provided with a roller 56 engageable by the node 38 of cam 37 for raising the pawl on each rotation of the cam 37, that is, once during each rotation of units dial 34. A spring 57 connected between an anchor pin 58 and a lug on tripping pawl 55 maintains the roller 55 in engagement with the periphery of cam 37 and the end of arm 52 against the periphery of notched disc 50.

Setting knobs 60, 61 to operate gear trains 62, 63 driving the gears 39, 46, respectively are provided for adjusting the units dial 34 and tens dial 44 to indicate the quantity of fluid to pass through the meter 10 before the cut-off mechanism releases the locking device for the valve 70 associated therewith to permit it to close.

In the form illustrated in the drawings the valve 70 is normally biased to closed position by a spring actuated stem or plunger 71 which projects from the valve casing through a bushing 72. A lever 73 pivotally mounted on a bracket 74 on the valve casing is provided with a cam 75 for depressing the plunger to open the valve. If desired a dash pot 76 may be provided for controlling the closing movement of valve 70 to cause it to close gradually when released, rather than instantaneously, in order to avoid hydraulic shocks due to too rapid closing of the valve.

Lever 73 is connected to a link 77 having a bifurcated end 78 provided with a spring pressed locking pin 79 engaging a notch 80 on a stud 81 carried by an arm 82 secured to a shaft 83 that is mounted in the register casing. As an alternative arrangement pin 79 may be located to engage the side of stud 81 to normally retain it positioned at the inner end of the slot between the bifurcations 78 for connecting link 77 to arm 82. Shaft 83 also carries an arm 84 provided with an anti-friction contact face 85 engageable by the end face 86 of a pivotally mounted detent 87 for locking lever 73 to hold valve 70 open until released by the operation of the cut-off mechanism. In the embodiment illustrated in the drawings, detent 87 is in the form of a bell crank having one arm 88 positioned by gravity to lockingly engage with the arm 84 associated with valve lever 73 and the other arm 90 positioned to be operated by the tripping pawl 55 that is actuated by the cut-off mechanism for releasing the detent. A stud 91 located between the arm of the detent limits its movements.

As shown in Fig. 2, the nose portion of the rocking arm 52 engaging the periphery of the notched disc 50 associated with the combination tens and hundreds dial 44 of the cut-off indicator, normally holds arm 54 positioned to maintain the tripping pawl 55 retracted out of engaging relation with the arm 90 of detent 87.

The operation is as follows: When a determined quantity of gasoline or other fluid is to be delivered, knob 28 is operated to set pointers 23, 26 at zero and knobs 60, 61 are manipulated to adjust the units dials 34 and tens dial 44 of the cut-off indicator to indicate the quantity to be delivered. Valve lever 73 is then operated to depress plunger 71 for opening valve 70 and delivery commences. Lever 73 acts through link 77 and arm 82 to rock the shaft 83 for swinging arm 84 clockwise (Figs. 2 and 4) to engage its contact face 85 with the end 86 of the arm 88 of detent 87 which acts under the force of gravity to lock the valve lever 73 for holding the valve 70 in open position until subsequently released.

As fluid flows through the meter the shaft 11 drives take-off shaft 17 and through worms 20, 22 operates totalizer 21 and advances pointers 23, 26 over scales 24, 27 to register the quantity delivered. Shaft 11 also drives take-off shaft 18 and rotates ratchet 35 which acts through pawls 36 on disc 37 to operate the dials 34, 44 of the cut-off indicator retrogressively.

The setting of dials 34, 44 by knobs 60, 61 causes cam 37 and notched disc 50 to be correspondingly set to displace the node 38 of the cam and notch 51 of the disc relatively to the arms 52, 54 of the rocking lever 49. The nose portion of the arm 52 of rocking lever 49 holds arm 54 thereof positioned to maintain tripping pawl 55 retracted from engaging relation with the arm 90 of detent 87, as shown in Fig. 2. Thus, during delivery of each ten gallons prior to the last ten of a delivery the node 38 of cam 37 in raising pawl 55 moves it in a path that does not intercept the arm 90 of detent 87 and operates idly.

When the tens dial 44 has been returned to zero indicating position the notch 51 of disc 50 is positioned beneath the nose of arm 52 and spring 57 acts to rock the arms 52 and 54 for positioning tripping pawl 55 beneath the arm 90 of detent 87, Fig. 4, so that when the pawl is again raised by the node of cam 37 during delivery of the last ten gallons it engages and operates detent 87 to release the arm 84 associated with valve lever 73 to permit the valve 70 to be closed by its spring.

Tripping pawl 55 may be operated by the node of cam 37 coincident with the return of units dial 34 to zero indicating position. However, as mentioned above, there is usually a certain lag in devices of this type between unlocking of the valve lever and full closing of the valve due to friction on plunger 71 and this lag is accentuated where a dash pot is provided to obviate hydraulic shocks.

As a consequence of the ordinary unavoidable time lag several extra gallons of fluid may pass through the meter after the cut-off indicator reaches zero and releases the valve lever before the valve is fully effective to stop delivery.

The present invention compensates for this time lag to avoid delivery of excess quantities of fluid by the provision of the adjustable connection between the cam disc 37 and the gear 39 fixed to units dial shaft 33 for operating the latter. On loosening of nuts 43 the pin and slot connection 41, 42 between the gear and disc permits the latter to be rotated on sleeve 40, as pawls 36 slip over the teeth of driving ratchet 35, to advance the node 38 of cam 37 relatively to gear 39 and consequently to the zero indicia of units dial 34. If desired the size of slots 42 may be such as to permit adjustments to be made within a range up to nine gallons but adjustment over a range of two gallons will ordinarily be sufficient. Thus, when the excess quantity of liquid that would be delivered because of the time lag is determined, it may be compensated for by adjusting the node of cam 37 to act at the proper time in advance of actual completion of delivery so that the quantity of fluid flowing through the meter during gradual closing of valve 70 is a part of the intended delivery and not an additional quantity. Variations in the viscosity of the fluid being metered may also result in a greater or lesser quantity of fluid flowing through the meter after release of the valve lever and prior to full closing of the valve than that for which adjustments were made on placing the metering device in service. This condition also may be compensated for by adjusting the relative position of disc 37 and gear 39 as described above. The adjustment of the node 38 relatively to the zero indicia of dial 34 also results in the latter reaching zero position upon actual completion of delivery. Pointers 23, 26 also reach the proper scale markings corresponding to the desired quantity when the valve is fully closed on full delivery of the desired volume of fluid.

As also mentioned above, it is necessary under certain conditions, to close valve 70 before completion of delivery of the pre-determined quantity for which dials 34, 44 are set. With the present invention the attendant's instinctive reaction in grasping the valve lever to close the valve would result in prompt closing of the valve without delaying to locate and operate a special release plunger, or the like, for detent 87. This is due in the present invention to the provision of the releasable connection between the link 77 and the arm 82 associated with the locking arm 84. When lever 73 is manually turned in a direction to close the valve 70 the spring pressed pin 79 on link 77 is automatically disengaged from the notch 80 in stud 81 permitting the valve lever to be freely operated to close the valve although the arm 84 remains lockingly engaged by detent 87.

Where the manual release of the valve, as described, is occasioned by the fact it has been discovered after delivery has commenced that the cut-off dials 34, 44 have been improperly set by inadvertence to a figure greater or less than the desired quantity, the dials may be reset to cause delivery of the proper amount although the delivery may have been interrupted when the delivery may have been interrupted includes a fractional quantity already delivered. This is due to the provision part of a gallon. This is due to the provision of the finely toothed ratchet 35 for driving the dials which permits the units dial 34 to be properly adjusted, after the fractional quantity already delivered has been taken into consideration, for resuming delivery and properly cutting off the flow of fluid without delivering a fraction of a gallon too much or too little, although the meter shaft and driving ratchet remain in the position assumed on delivery of the fractional part of a gallon.

When lever 73 is again operated to open the valve to resume delivery, the spring pressed locking pin 79 reengages the stud 81 reconnecting the lever to locking arm 84 so that the valve is again normally locked in closed position pending release of detent 87.

It should be noted that since detent 87 is maintained in contact with arm 83 by gravity and is not normally engaged by any part of either the cut-off mechanism or the registering devices, no load is imposed upon the latter by the spring of valve 70 as a result of the locking engagement between the detent 87 and the arm 83 associated with the valve lever 73.

It should also be noted that because of the relative proportions of arms 84 and 82 the spring of valve 70 does not act to bind the detent 87 or hinder its releasing movement. Moreover, because of the line engagement of the end 86 of detent 87 with contact face 85 on arm 84 and the movement of the end of the detent in a substantially straight line along the antifriction contact face in the releasing movement only a small load is imposed upon the cut-off mechanism in releasing the detent.

Although a specific embodiment of the invention has been described in detail there are many changes and variations which may be made without departing from the invention and it is desired to include all such changes and variations within the scope of the following claims.

I claim:

1. In combination with a meter, a valve controlling the flow of fluid through the meter, means tending to close said valve, and a lever operable to open said valve; means for holding said valve open until a predetermined quantity of fluid has passed through said meter comprising, a releasable detent locking said lever to hold said valve open, a member adapted to be actuated for releasing said detent, means controlled by said meter for normally maintaining said member out of operative relation to said detent, means for positioning said member in operative relation to said detent when a determined quantity of fluid has passed through the meter, and means operated by said meter for actuating said member to release said detent.

2. In combination with a meter, a valve controlling the flow of fluid through the meter, means tending to close said valve, and a lever operable to open said valve; means for locking said valve open until a predetermined quantity of fluid has passed through said meter comprising, a locking member associated with said valve lever, a releasable detent engaging said member to hold said valve open, a tripping pawl adapted to be actuated for operating and releasing said detent, means controlled by said meter for normally maintaining said pawl out of operative relation to said detent, means subject to said control means and operative when a predetermined quantity of fluid has passed through the meter for positioning said pawl in operative relation to said detent, and means operated by said meter for actuating said pawl to release said detent.

3. In combination with a meter, a valve controlling the flow of fluid through the meter, means tending to close said valve, and a lever operable to open said valve; means for holding said valve open until a predetermined quantity of fluid has passed through said meter comprising a releasable detent locking said lever to hold said valve open, a tripping member adapted to engage said detent for releasing the latter, means controlled by said meter for normally maintaining said member positioned out of engaging relation with said detent, said means being operable by said meter for permitting said member to be positioned in engaging relation with said detent, means for positioning said member in engaging relation with said detent, and means operated by said meter for operating said member to engage and release said detent.

4. In combination with a meter, a valve controlling the flow of fluid through the meter, means tending to close the valve, and a lever operable to open said valve; a locking member operatively associated with said lever, a detent engaging said member to lock said lever for maintaining said valve open, a cam driven by said meter, a tripping pawl positioned to be operated by said cam and adapted to engage and release said detent, a second cam driven by the meter, and means associated with said second cam and said tripping pawl for normally maintaining the latter out of engaging relation with said detent.

5. In combination with a meter, a valve controlling the flow of fluid through the meter, means tending to close the valve, and a lever operable to open said valve; a locking member operatively associated with said lever, a detent engaging said member to lock said lever for maintaining said valve open, a cam driven by said meter, a tripping pawl positioned to be operated by said cam and adapted to engage and release said detent, a second cam driven by the meter, means associated with said second cam and said tripping pawl for normally maintaining the latter out of engaging relation with said detent during the operation of said pawl by said first cam until a determined quantity of fluid has passed through said meter, and means subsequently operative to position said pawl in engaging relation with said detent for releasing the latter when said pawl is actuated by said first cam upon flow of a further determined quantity of fluid through said meter.

6. In combination with a meter, a valve controlling the flow of fluid through the meter, means tending to close said valve, and a lever operable to open said valve; means for locking said valve open until a predetermined quantity of fluid has passed through said meter comprising, a locking member associated with said lever, a releasable detent engaging said member to hold said valve open, a tripping pawl adapted to be actuated to engage said detent for releasing the latter, a rocking arm supporting said pawl, a cam, a second rocking arm engaging said cam and operatively associated with said first rocking arm to maintain said pawl positioned out of operative relation with said detent, meter driven means for operating said second cam to permit movement of said rocking arms, means for moving said rocking arms to position said pawl in engaging relation with said detent, and a cam operated by said meter for actuating said tripping pawl to engage and release said detent.

7. In combination with a meter, a valve controlling the flow of fluid through the meter, means tending to close said valve, and a lever operable to open said valve; means for locking said valve open until a predetermined quantity of fluid has passed through said meter comprising, a locking member associated with said lever, a releasable detent engaging said member to hold said valve open, a tripping pawl adapted to be actuated to engage and release said detent, a rocking arm supporting said pawl, a notched cam, a second rocking arm engaging the periphery of said cam and connected to said first rocking arm to normally maintain said pawl positioned out of operative relation to said detent, meter driven means for operating said cam to dispose said notch relatively to said second rocking arm to permit movement of said rocking arms, means for rocking said arms to position said pawl in engaging relation with said detent, and a cam driven by said meter for actuating said pawl to engage and release said detent.

8. In combination with a meter, a valve controlling the flow of fluid through the meter, means tending to close the valve, a lever operable to open the valve, a locking member associated with said lever, and a detent engaging said member to lock said lever for maintaining the valve open, said valve tending to close gradually upon unlocking of said valve lever; cut-off mechanism for releasing said detent including an indicator operable by said meter and settable to determine the quantity of fluid to flow through said meter before release of said detent, a cam operable by the meter for releasing said detent, and an adjustable driving connection between said cam and indicator enabling said cam to be adjusted relatively to said indicator for compensating for the flow of fluid through said meter subsequent to unlocking of said valve lever and prior to closing of said valve.

9. In combination with a meter, a valve controlling the flow of fluid through the meter, means tending to close the valve, a lever operable to open the valve, a locking member associated with said lever, and a detent engaging said member to lock said lever for maintaining the valve open, said valve tending to close gradually upon unlocking of said valve lever; cut-off mechanism for releasing said detent including an indicator operable by said meter and settable to determine the quantity of fluid to flow through said meter before release of said detent, a cam operable by the meter for releasing said detent, means for compensating for the flow of fluid through the meter subsequent to unlocking of said valve lever and prior to full closing of said valve comprising a pin and slot driving connection between said indicator and said cam enabling relative adjustment of said indicator and cam for positioning the latter to release said detent prior to positioning of said indicator by the meter to indicate completion of delivery of the determined quantity of fluid.

10. In combination with a meter, a valve controlling the flow of fluid through the meter, means tending to close the valve, and a lever operable to open the valve, a locking member associated with said lever, a detent engaging said member to lock said valve lever for maintaining said valve open, cut-off mechanism driven by the meter and operative on flow of a predetermined quantity of fluid through the latter for tripping said detent to cause closing of said valve; means for releasably connecting said lever to said locking member to permit operation of said lever to close the valve prior to tripping of said detent by said cut-off mechanism comprising, a member connected to said lever, a member connected to said locking member, and connecting means carried by one of said members releasably engaging the other member to permit said lever to be operated to close said valve without disengaging said locking member and detent.

11. In combination with a meter, a valve controlling the flow of fluid through the meter, means tending to close the valve, and a lever operable to open the valve; a locking member associated with said lever, a detent engaging said member to lock said valve lever for maintaining said valve open, cut-off mechanism driven by the meter and operative on flow of a predetermined quantity of fluid through the latter for tripping said detent to cause closing of said valve; means for releasably connecting said lever to said locking member to permit operation of said lever to close the valve prior to tripping of said detent by said cut-off mechanism comprising, a link attached to said lever, a stud associated with said locking member, and a spring pressed pin carried by said link releasingly engaging said stud to permit said lever to be operated to close said valve without disengaging said detent from said locking member.

CHARLES S. HAZARD.